United States Patent [19]

Nagashima et al.

[11] Patent Number: 4,900,909
[45] Date of Patent: Feb. 13, 1990

[54] CARD PRINTING APPARATUS

[75] Inventors: Masayoshi Nagashima, Chigasaki; Shin-ichi Kawahara, Sagamihara, both of Japan

[73] Assignee: Kabushiki Kaisha Toshiba, Kawasaki, Japan

[21] Appl. No.: 210,933

[22] Filed: Jun. 24, 1988

[30] Foreign Application Priority Data

Jun. 30, 1987 [JP] Japan ................................ 62-162877

[51] Int. Cl.$^4$ ............................................ G06K 19/00
[52] U.S. Cl. .................................... 235/487; 235/385; 235/432
[58] Field of Search ............... 235/449, 385, 487, 432; 360/2, 81; 101/66

[56] References Cited

U.S. PATENT DOCUMENTS

| 3,445,633 | 5/1969 | Ratner | 235/385 |
| 3,787,875 | 1/1974 | Gechele | 360/2 |
| 3,803,388 | 4/1974 | Williamson | 360/81 |
| 3,940,795 | 2/1976 | Lemelson | 360/81 |
| 4,106,062 | 8/1978 | Foote | 360/2 |
| 4,136,261 | 1/1979 | Wada | 360/81 |
| 4,288,688 | 6/1980 | Kiyama et al. | |
| 4,746,233 | 5/1988 | Osuna | 101/66 |

Primary Examiner—Harold I. Pitts
Attorney, Agent, or Firm—Cushman, Darby & Cushman

[57] ABSTRACT

An apparatus for issuing plane tickets by communicating with a host apparatus using data from a keyboard or a bar code reader includes a hopper for storing plane tickets having a magnetic stripe extending along the longer sides thereof. A convey mechanism picks up the plane tickets one by one from the hopper and conveys the ticket on a convey path while aligning the shorter sides of the card with the convey direction.

15 Claims, 14 Drawing Sheets

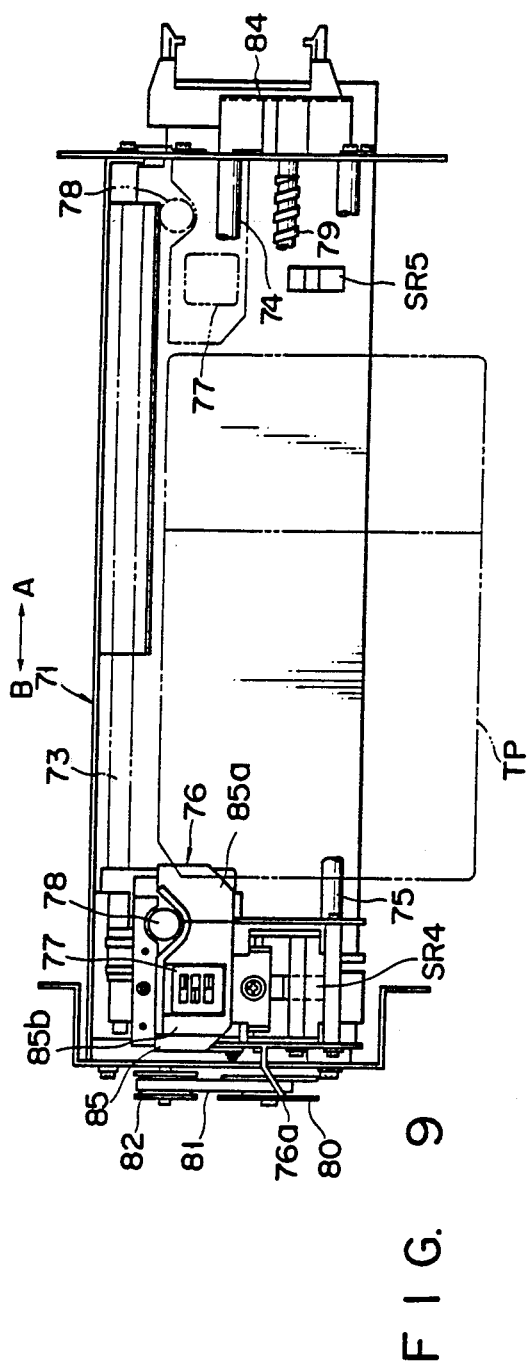
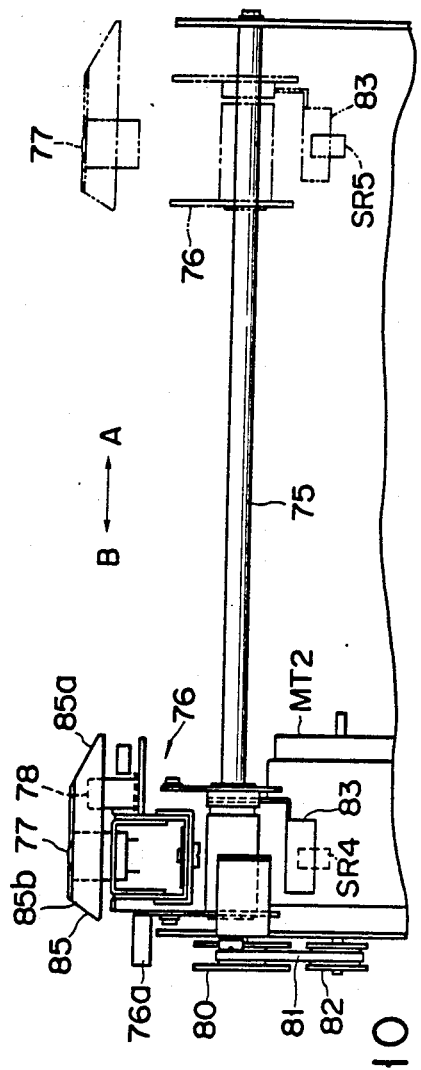
FIG. 9
FIG. 10

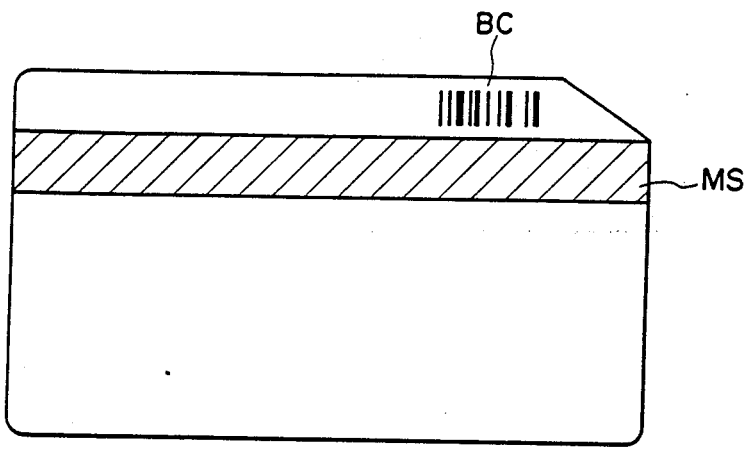
F I G. 22A
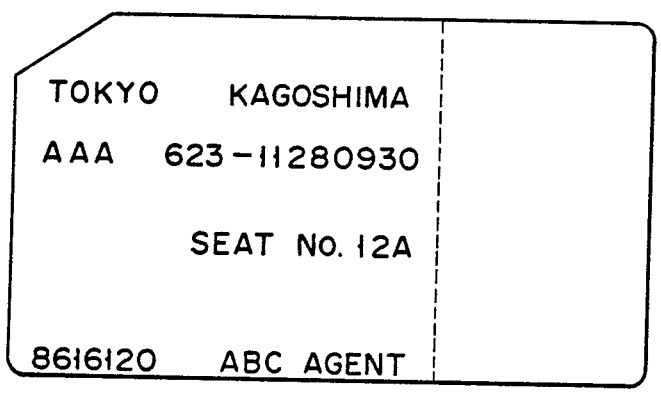
F I G. 22B

CARD PRINTING APPARATUS

BACKGROUND OF THE INVENTION

1. Field of the Invention

The present invention relates to a card printing apparatus for printing or marking predetermined items on a card-like medium such as paper or plastic, thereby selling or issuing railroad reserved-seat tickets, plane tickets, and various ID cards.

2. Description of the Related Art

A conventional example of such an apparatus is a plane reservation ticket vending machine or a toll ticket issuing machine (disclosed in U.S. Pat. No. 4,288,688). Generally, in order to purchase a plane ticket, a customer purchases a reservation ticket at a business office of a plane company or a travel agency and exchanges the reservation ticket for a plane ticket at an airport.

In the above conventional system, a terminal apparatus itself does not directly issue plane tickets. Therefore, in recent years, a system has been developed in which terminal apparatuses are connected to a host apparatus through subscriber telephone lines so that the terminal apparatuses can issue plane tickets while transmitting/receiving data to/from the host apparatus.

However, since such a conventional terminal apparatus, i.e., a reservation ticket vending machine or a toll ticket issuing machine is large in size, installation places are limited.

SUMMARY OF THE INVENTION

It is, therefore, an object of the present invention to provide a card printing apparatus which is small in size to eliminate limitations of installation places and can efficiently print or mark predetermined items on a card-like medium.

It is another object of the present invention to provide a card printing apparatus which can efficiently print or mark and magnetically record predetermined items on a card-like medium having a magnetic stripe.

A card printing apparatus according to the present invention comprises convey means for conveying a card so that the direction of the shorter sides of the card coincides with a convey direction and printing means for printing predetermined items on the card conveyed by the convey means.

Another card printing apparatus according to the present invention comprises convey means for conveying a card having a magnetic stripe extending along its longer sides so that the direction of shorter sides of the card coincides with a convey direction, locking means for stopping the card conveyed by the convey means at a predetermined position, and magnetically recording means, having a magnetic head moved in a direction perpendicular to the convey direction, for magnetically recording predetermined items on the magnetic stripe of the card stopped by the locking means.

BRIEF DESCRIPTION OF THE DRAWINGS

FIG. 9 is a plan view of a head driving unit;

FIG. 10 is a front view of the head driving unit;

FIGS. 22A and 22B are views showing the obverse and reverse surfaces of the issued plane ticket, respectively.

DETAILED DESCRIPTION OF THE PREFERRED EMBODIMENTS

Figure 1:
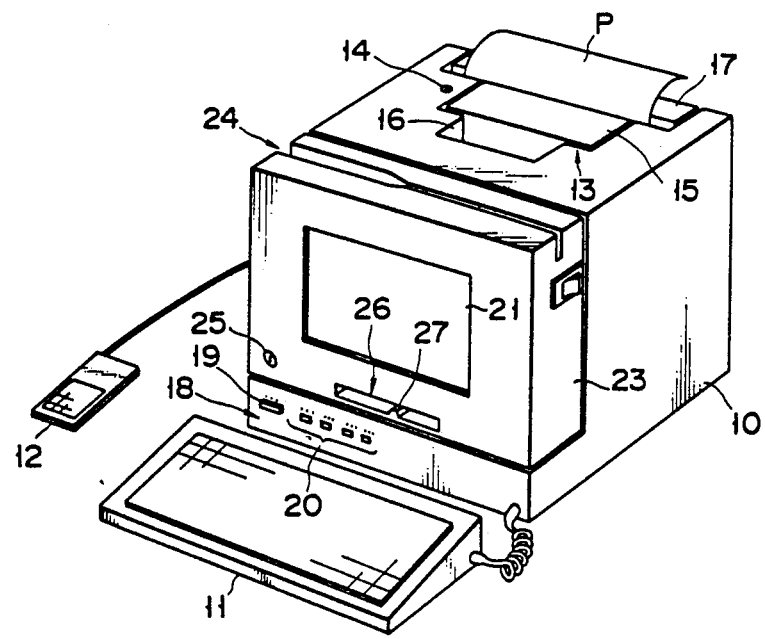
FIG. 1 is a perspective front view of a plane ticket vending apparatus according to an embodiment of the present invention.
Figure 2:
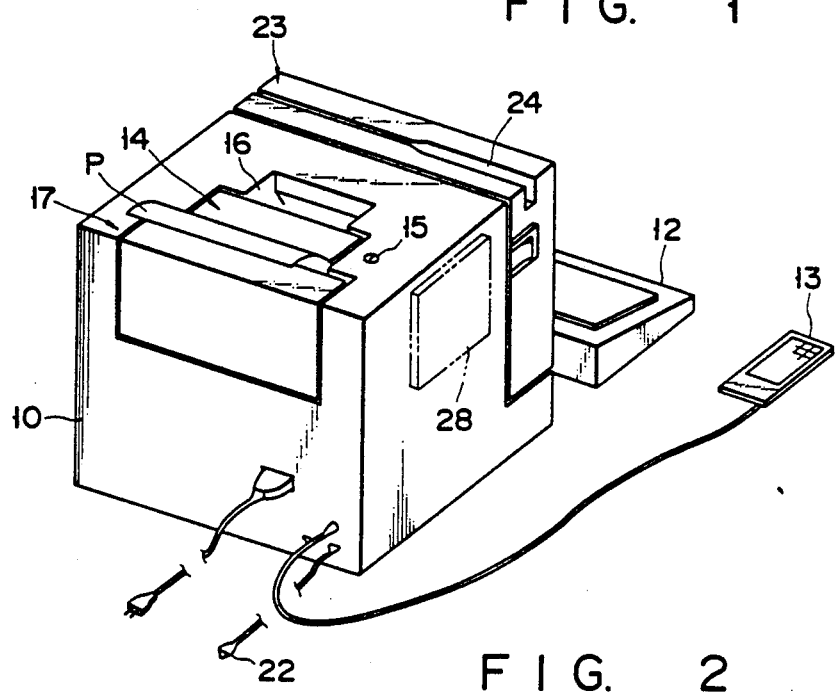
FIG. 2 is a perspective rear view of the plane ticket vending apparatus.

FIGS. 1 and 2 are perspective front and rear views of a plane ticket vending apparatus according to an embodiment of a card printing apparatus of the present invention.

Apparatus main body 10 is connected to keyboard 11 and ten-key pad 12. Information concerning issuance, reservation, alteration, verification, inquiry, and the like of, e.g., a plane ticket are input from keyboard 11. Numerals such as a personal identification number of a credit card of a customer is input from ten-key pad 12 by the customer when he or she wants to buy a plane ticket using the credit card.

Hopper 13 for housing plane ticket paper before issuance (printing) is formed at an upper portion of main body 10. Cover 15 which is opened/closed by key 14 is mounted on hopper 13. Stacker 16 for housing an issued plane ticket and discharge unit 1 for discharging journal paper P printed by a journal printer to be described later are formed near hopper 13.

Operation panel 18 is formed on the front surface of main body 10. Panel 18 includes journal paper feed switch 19 and lamp group 20 for indicating power ON/OFF, input enable, during conversation, and alarm.

Display 21 consisting of, e.g., a plasma display is formed on the front surface and above panel 18 of main body 10. Display 21 displays information input from keyboard 11 or information sent from a host apparatus (not shown) through subscriber telephone line 22. Display 21 is formed in pivoting unit 23 which can be freely opened/closed with respect to main body 10.

Magnetic card reader 24 which is known to those skilled in the art is formed at an upper portion of pivoting unit 23. Card reader 24 reads magnetic information of, e.g., a credit card. Power switch 25 and ticket insertion port 26 are formed on the front surface of pivoting unit 23.

Party plane tickets or handwritten plane tickets, detailed statements of a credit which record a note of plane ticket sales, complimentary tickets, and the like are inserted into port 26. In this case, the size of a complimentary ticket is smaller than those of the other tickets. Therefore, port 26 has an arrangement capable of positioning any of these tickets.

Figure 3:
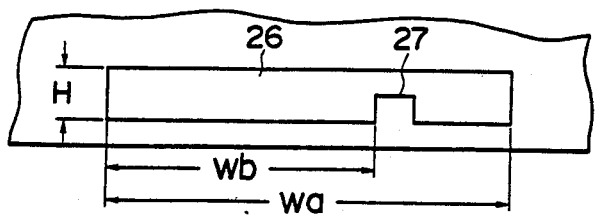
FIG. 3 is a front view of a ticket insertion port.

FIG. 3 is a front view of ticket insertion port 26. Width Wa of port 26 coincides with the width of a large ticket. Guide portion 27 lower than height H of port 26 is formed at a position separated apart from the left end portion in FIG. 3 by length Wb in the transverse direction of a small ticket, on a bottom portion of port 26, along an insertion direction of the ticket.

In the above arrangement, a large ticket such as a party plane ticket is inserted into the upper portion of guide portion 27 and guided by both sides of port 26 in the transverse direction. A small ticket such as a complimentary ticket is inserted between and guided by the left end of port 26 and guide portion 27.

Figure 4:
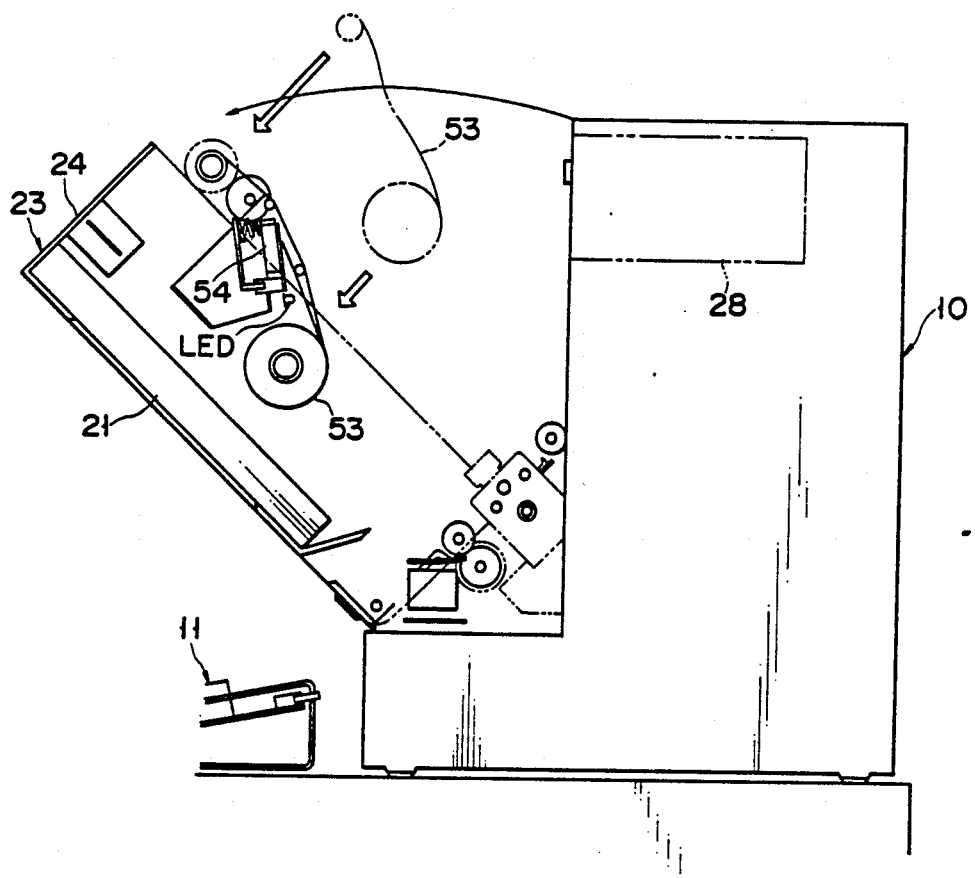
FIG. 4 is a side view of the plane ticket vending apparatus in which a display unit is inclined forward to be opened.

As shown in FIG. 4, floppy disk drive 28 is disposed in main body 10. When drive 28 is opened by inclining pivoting unit 23 forward, floppy disks can be inserted in and detached from drive 28.

Figure 5:
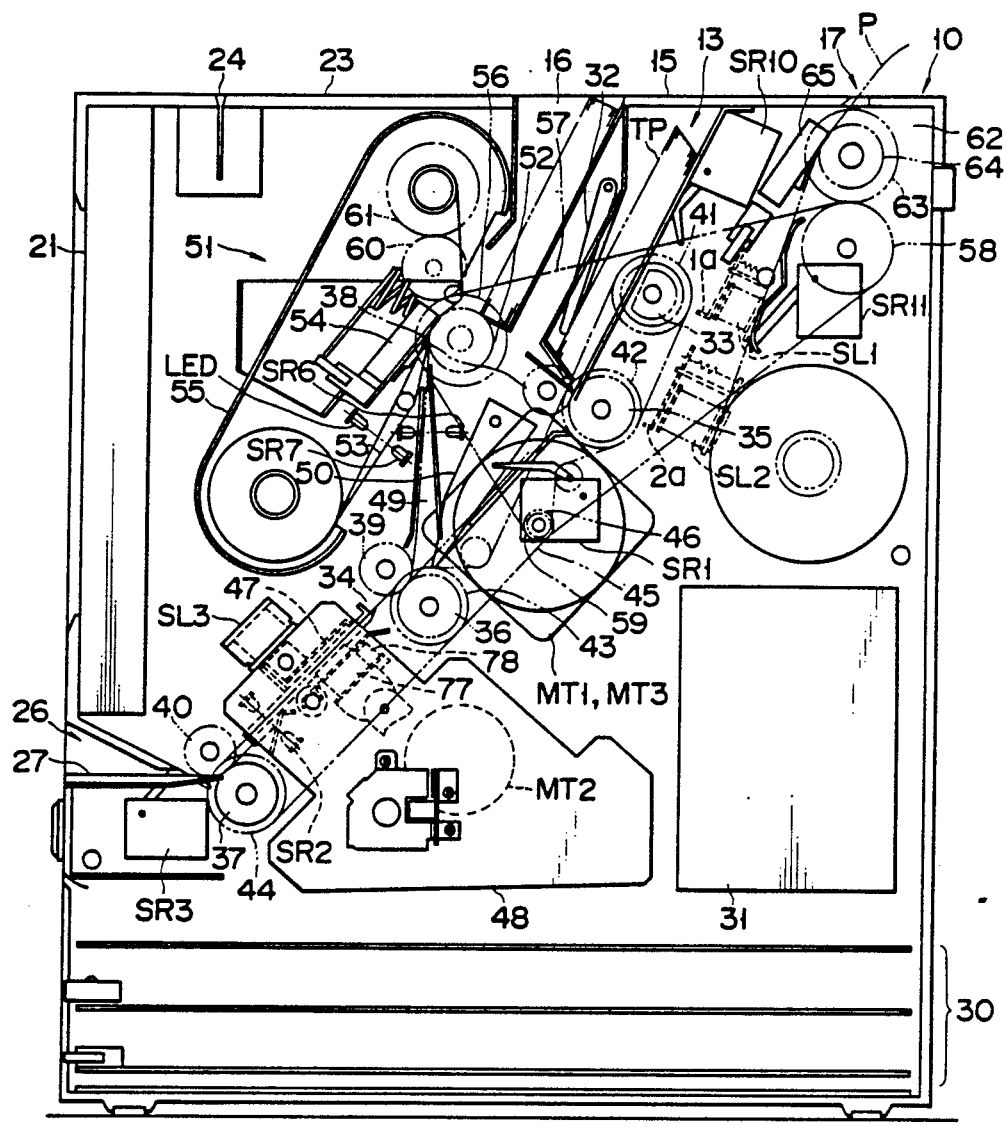
FIG. 5 is a sectional view of an arrangement of a main part of the plane ticket vending apparatus.
Figure 6:
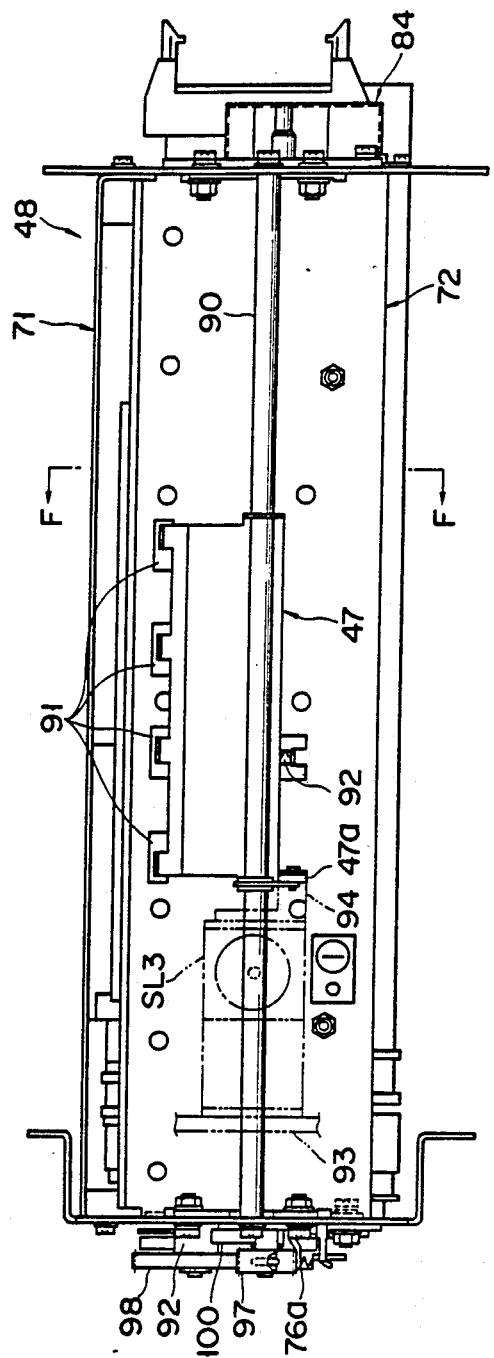
FIG. 6 is a plan view of a magnetic recording encoding unit.

FIG. 5 is a sectional view showing an internal structure of main body 10.

Circuit boards 30 on which circuits of a control system are arranged are located on an inner bottom portion of main body 10, and power source circuit 31 is located above boards 30.

Hopper 13 houses plane ticket paper TP before issuance. In order to improve convey efficiency, paper TP is conveyed so that its shorter sides are aligned along a convey direction. That is, as compared with the case wherein the longer sides of the plane ticket paper are aligned along the convey direction, the number of sheets of the plane ticket paper arranged on a convey path can be increased.

Paper TP is urged by urging member 32 and picked up by pickup roller 33 one after another from the lowest one to convey path 34. Convey rollers 35 and 36 are arranged in path 34 at a predetermined interval therebetween. Insertion roller 37 is arranged near port 26.

Driven rollers 38, 39, and 40 are urged against rollers 35, 36, and 37, respectively. Pulleys 41, 42, 43, and 44 are mounted on rollers 33, 35, 36, and 37, respectively. Belt 45 is looped around pulleys 41 to 44. Belt 45 is wound with pulley 46 mounted on motor MT1, and rollers 33, 35, 36, and 37 are driven by common motor MT1.

Spring clutches (not shown) are disposed between roller 33 and pulley 41 and between roller 35 and pulley 42. When stopper members 1a and 2a of solenoids SL1 and SL2 are energized, rollers 33 and 35 slip with pulleys 41 and 42, respectively.

Stopper member 47 is disposed between rollers 36 and 37 to position plane ticket paper supplied from hopper 13 or a ticket supplied from port 26 in association with roller 37. Stopper member 47 is driven by solenoid SL3. Solenoid SL3 is mounted on magnetic recording encoding unit 48 having a bar code reading unit and a magnetic information reading/writing unit. Unit 48 will be described in detail later with reference to FIGS. 6 to 10.

Sensor SR10 for detecting the presence/absence of paper TP is mounted on hopper 13. Paper feed sensor SR1 for detecting feeding of paper TP is arranged between rollers 35 and 36. Positioning sensor SR2 for detecting the presence/absence of the plane ticket paper at a position corresponding to unit 48 is arranged between rollers 36 and 37. Insertion sensor SR3 for detecting insertion of a ticket is arranged between port 26 and roller 37.

Branch path 49 is disposed near roller 36. Selector gate 50 is arranged between branch path 49 and convey path 34. Gate 50 is normally pivoted toward path 34 by its own weight. Paper TP picked up from hopper 13 pushes gate 50 upward and is conveyed through the gap below gate 50.

By reversely rotating motor MT1, the plane ticket processed by unit 48 is conveyed in an opposite direction through path 34 by rollers 36 and 39 and guided to path 49 through gate 50.

Printer 51 is disposed at an end portion of path 49. Printer 51 is constituted by platen roller 52 and thermal head 54 which is caused to abut against roller 52 through ink ribbon 53. Ribbon 53 is housed in ribbon cassette 55. Head 54 has a length sufficient to cover the longer side of a large ticket and prints in units of lines. Note that convey of tickets is temporarily stopped during printing of one line.

Pulley 56 is mounted on roller 52 through a one-way clutch (not shown), and belt 57 is looped around pulley 56. Pulleys 58 and 59 are rotated by belt 57, and pulley 59 is driven by motor MT3 located at the same position as motor MT1. Therefore, roller 52 rotates when motor MT3 rotates in the forward direction and stops when motor MT3 rotates in the reverse direction.

Pulley 61 for driving ribbon 53 through pulley 60 contacts with pulley 56, and therefore ribbon 53 is also driven by motor MT3. An issued plane ticket having predetermined information printed by printer 51 thereon is stacked in stacker 16.

Note that printing start sensor SR6 for detecting plane ticket paper and outputting a printing start signal is arranged in path 49. Ribbon sensor SR7 is arranged at a running portion of ribbon 53.

Journal printer 62 is disposed near pulley 58. Pulley 63 contacts with pulley 58. Platen roller 64 is mounted on pulley 63 through a one-way clutch (not shown). Roller 64 stops when motor MT3 rotates in the forward direction and rotates when motor MT3 rotates in the reverse direction.

Thermal head 65 abuts against roller 64 through journal paper (thermal paper) P, and predetermined information is recorded on paper P. Printed paper P is discharged outside main body 10 from discharge unit 17. Note that paper sensor SR11 for detecting the presence/absence of paper P is disposed in printer 62.

Platen roller 52 is located in main body 10. Thermal head 54, ink ribbon 53, pulleys 60 and 61, and light-emitting diode LED which constitutes ribbon sensor SR7 are located in pivoting unit 23 mounted on main body 10. Therefore, as shown in FIG. 4, by opening unit 23, ribbon 53 can be easily replaced.

Magnetic recording encoding unit 48 will be described below.

FIGS. 6 to 10 show encoding unit 48. Encoding unit 48 is constituted by head driving unit 71 having a magnetic head and the like, and ticket holding unit 72 mounted on unit 71 and constituting part of convey path 34.

FIGS. 9 and 10 show head driving unit 71. Guide shafts 73, 74, and 75 are arranged along the longitudinal direction of unit 71. Head unit 76 is movably fitted on shafts 73, 74, and 75. Magnetic head 77 and bar code reader 78 are located in unit 76.

Head 77 is a combination head having functions of reading, writing, and verifying (read after write). Each function can be performed in an independent step in either moving direction of unit 76. Magnetic head 77 can correspond to two high and low coercive forces of 2750 (Oe) and 650 (Oe).

Bar code reader 78 is constituted by a light-emitting diode and a phototransistor (neither of which are shown). As shown in FIG. 22A, positions of head 77 and reader 78 are defined in correspondence to the positions of magnetic stripe MS and bar code BC formed in a plane ticket or the like.

Screw 79 threadably engaged with head unit 76 is arranged between shafts 74 and 75. Pulley 80 is mounted on one end portion of screw 79 and coupled through belt 81 to pulley 82 mounted on motor MT2. Therefore, unit 76 is moved in a direction indicated by arrows A and B in FIGS. 9 and 10 in accordance with a driving direction of motor MT2.

A moving position of unit 76 is detected when blocking member 83 mounted on unit 76 blocks H/P (Home Position) sensor SR4 and E/P (End Position) sensor SR5 each consisting of a photocoupler arranged at both ends in the longitudinal direction of head driving unit 71.

Encoder unit 84 is mounted on the other end portion of screw 79. Unit 84 is constituted by a disk (not shown) having a plurality of slits along its circumferential direction and photocoupler 84a for detecting the slits. The recording density of magnetic head 77 is controlled in accordance with an output signal from unit 84.

Guide unit 85 is mounted on head 77 and reader 78. Inclined portions 85a and 85b are formed at both ends in a moving direction of unit 85. By inclined portions 85a and 85b, head unit 76 can be smoothly moved with respect to plane ticket paper TP positioned as indicated by an alternate long and two dashed line. While unit 76 is moved, guide unit 85 guides and holds the plane ticket in place of pivoting convey path 96 to be described later.

Figure 12:
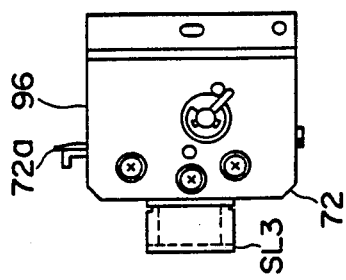
FIG. 12 is a side view of the ticket holding unit.
Figure 11:
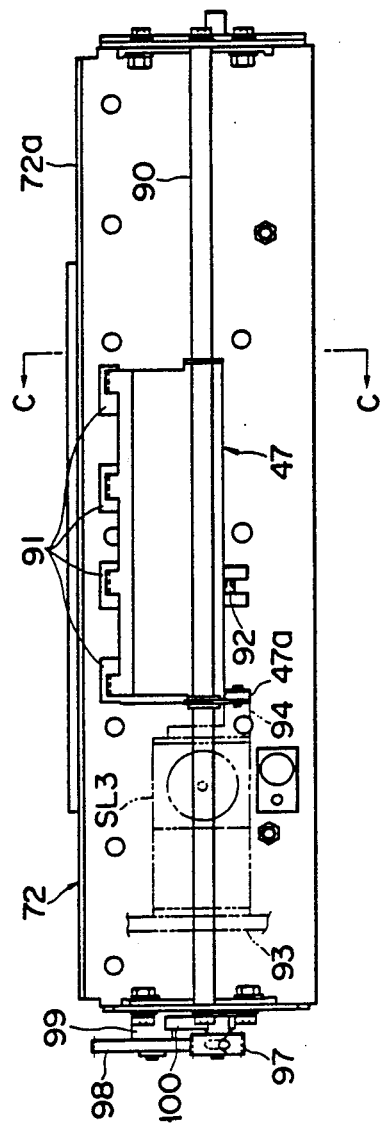
FIG. 11 is a plan view of a ticket holding unit.
Figure 13:
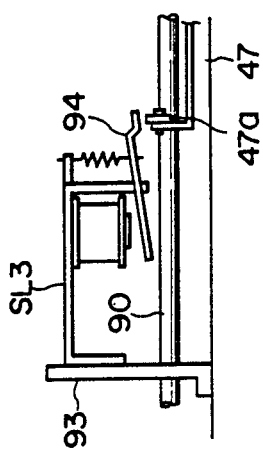
FIG. 13 is a side view of a mounting position of a solenoid.

FIGS. 11 to 13 show ticket holding unit 72. Fixed convey path 72a for constituting part of convey path 34 is formed on unit 72. As shown in FIG. 11, the proximal end portion of stopper member 47 is pivotally supported by shaft 90 on an upper surface portion of path 72a. The distal end portions of member 47 can project from a plurality of through holes 91 formed in path 72a. Spring 92 is fixed to the proximal end portion of member 47, and member 47 is normally biased so that its distal end portions project from through holes 91.

Solenoid SL3 is disposed on an upper surface portion of ticket holding unit 72. Solenoid SL3 is mounted on holding member 93 fixed on the upper surface portion of path 72a and therefore is mounted together with unit 72 on head driving unit 71.

As shown in FIG. 13, movable member 94 is disposed in solenoid SL3. When solenoid SL3 is turned on, one end portion of movable member 94 abuts against projection 47a formed at the proximal end portion of stopper member 47. In this state, member 47 is pivoted against a biasing force of spring 92, and its distal end portion is extracted from convey path 34.

Figure 14:
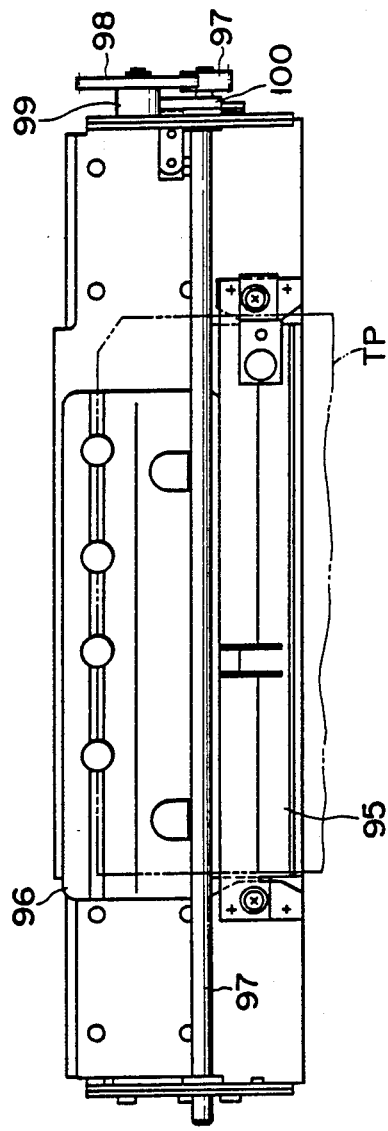
FIG. 14 is a bottom view of the ticket holding unit.
Figure 15:
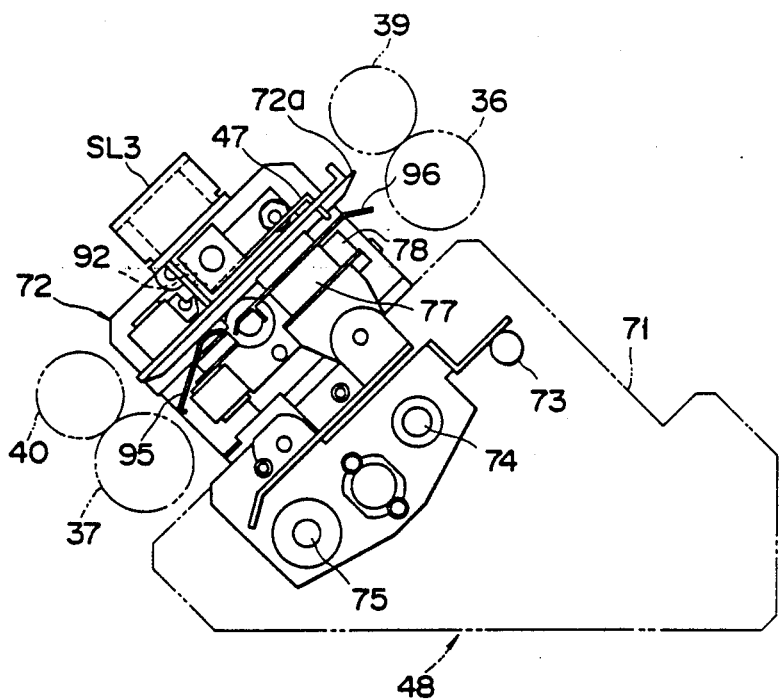
FIG. 15 is a sectional view of an arrangement of the magnetic recording encoding unit taken along line F-F' of FIG. 6.

As shown in FIGS. 14 and 15, convey path 95 consisting of a leaf spring and constituting convey path 34 together with fixed convey path 72a, and pivoting convey path 96 are mounted on a lower surface portion of path 72a. Paths 95 and 96 are formed in correspondence to a convey position of paper TP. The proximal end portion of path 96 is pivotally held by shaft 97.

Figure 7:
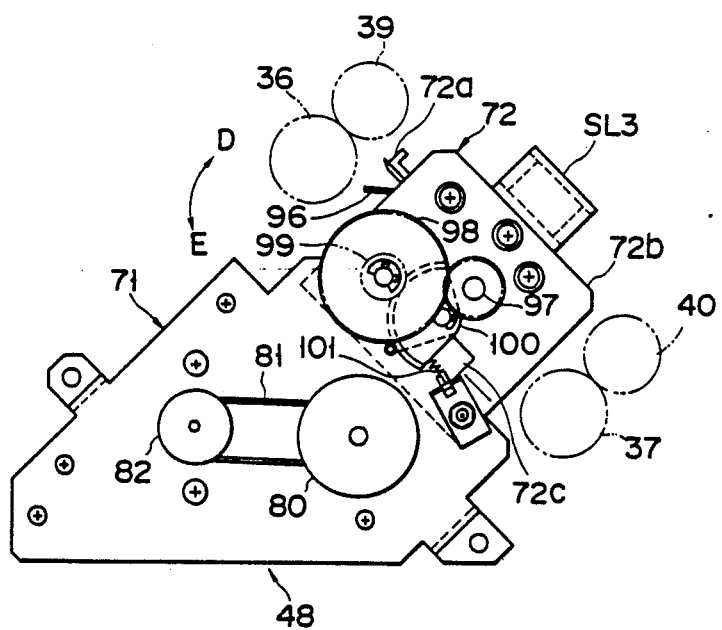
FIG. 7 is a right side view of the magnetic recording encoding unit.
Figure 8:
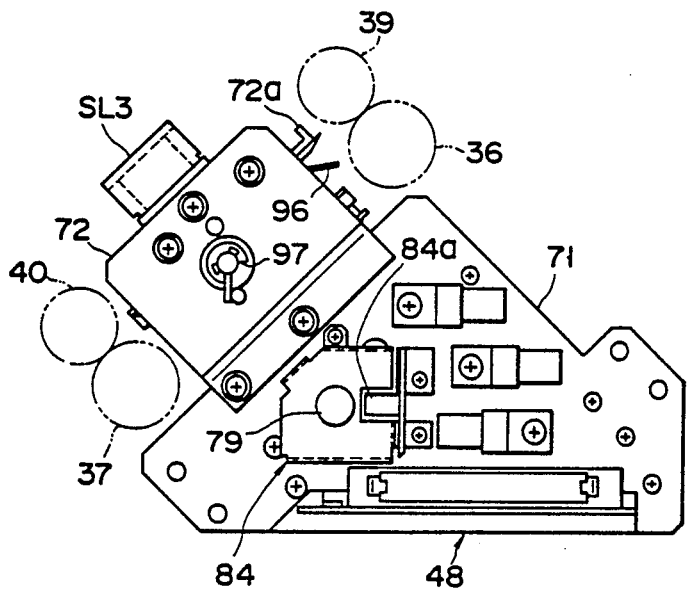
FIG. 8 is a left side view of the magnetic recording encoding unit.

As shown in FIGS. 7 and 14, gear 98 is fixed to one end portion of shaft 97. Gear 100 meshes with gear 97 through gear 98 and gear 99 which is coaxially fixed to gear 98. Gear 100 has a sector shape and is biased by spring 101 as shown in FIG. 7.

Figures 16, 17:
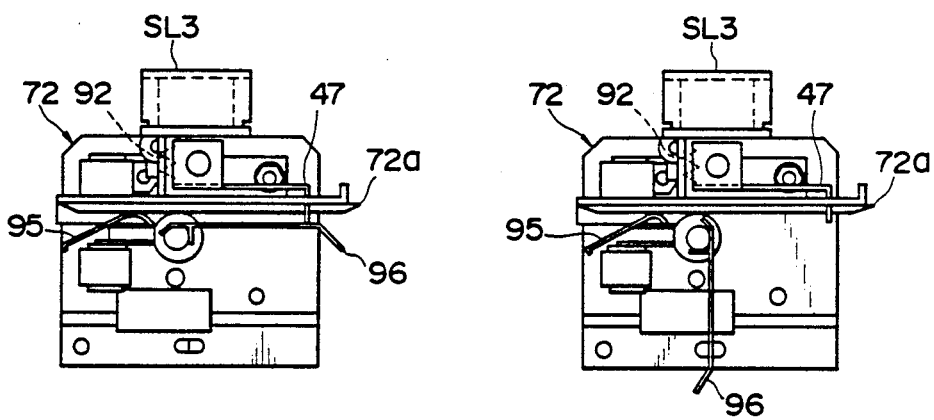
FIG. 16 is a sectional view of a pivoting convey path taken along line C-C' of FIG. 11 when the path is horizontally arranged.
FIG. 17 is a sectional view of the pivoting convey path taken along line C-C' of FIG. 11 when the path is vertically arranged.

Head unit 76 is normally stopped at a position shown in FIG. 9. Inclined urging member 76a is fixed to unit 76. In FIG. 9, urging member 76a projects from through hole 72c (shown in FIG. 7) formed in frame 72b of ticket holding unit 72. Therefore, as indicated by a dotted line in FIG. 7, gear 100 is pivoted in a direction indicated by arrow D, and pivoting convey path 96 is arranged substantially parallel to fixed convey path 72a as shown in FIG. 16.

In this state, when head unit 76 is moved in a direction indicated by arrow A shown in FIG. 9, urging member 76a is pulled out from through hole 72c. For this reason, gear 100 is pivoted in a direction indicated by arrow E to a position indicated by a solid line in FIG. 7. Therefore, as shown in FIG. 17, path 96 is pivoted to a position perpendicular to path 72a and hence unit 76 can be moved.

Figure 18:
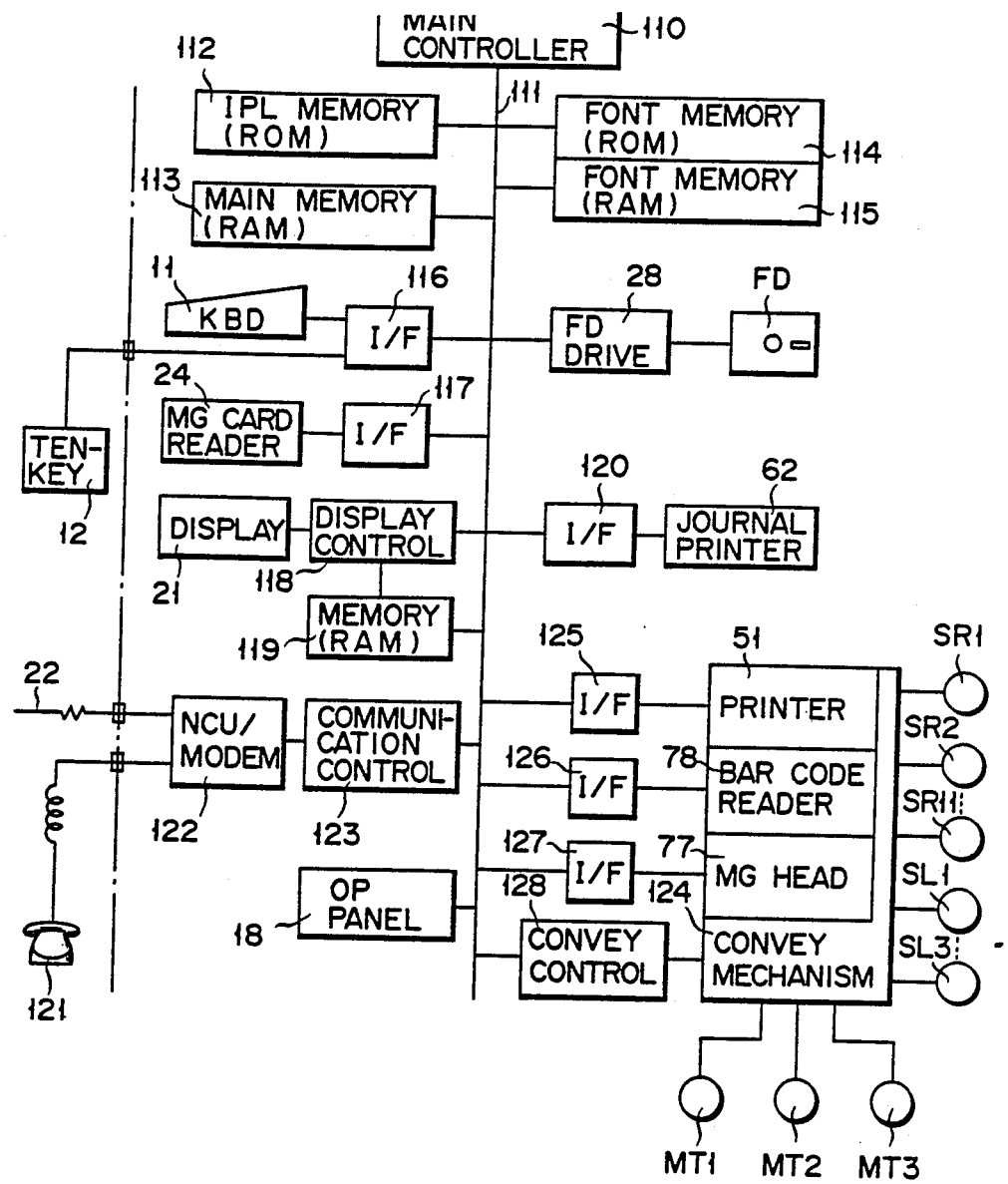
FIG. 18 is a circuit diagram of a control system.

FIG. 18 shows an arrangement of a control system.

Main controller 110 controls the entire apparatus. Controller 110 is connected, through bus line 111, to IPL memory 112 consisting of a ROM which stores an initial program loader, main memory 113 consisting of a RAM, and font memories 114 and 115 consisting of a ROM and a RAM which store character fonts, respectively. Keyboard 11 and ten-key pad 12 are connected to line 111 through keyboard interface 116 (term "interface" will be referred to as an I/F hereinafter), and magnetic card reader 24 is connected to line 111 through magnetic card reader I/F 117.

Floppy disk drive 28 is connected to line 111, and display 21 is connected to display control 118. Memory 119 connected to line 111 and consisting of a RAM which stores a text is connected to control 118. Floppy disk FD to be mounted in drive 28 stores system programs and data such as firmware and character fonts. When a power source of the apparatus main body is turned on, the stored programs and data are loaded on memories 113 and 115 by the IPL stored in memory 112.

Journal printer 62 is connected to line 111 through printer I/F 120. Subscriber telephone line 22 and telephone set 121 are connected to line 111 through NCU (Network Control Unit)/modem 122 and communication control 123. When the power source of the apparatus main body is turned on, control 123 automatically performs dialing to be connected to the host apparatus. Telephone set 121 can be used even when the power source of the apparatus main body is OFF.

Operation panel 18 is connected to line 111. Printer 51, bar code reader 78, magnetic head 77, and convey mechanism 124 are connected to line 111 through printer I/F 125, bar code reader I/F 126, magnetic processor I/F 127, and convey control 128, respectively.

Sensors SR1 to SR11, solenoids SL1 to SL3, and motors MT1, MT2, and MT3 are connected to mechanism 124.

Figure 19:
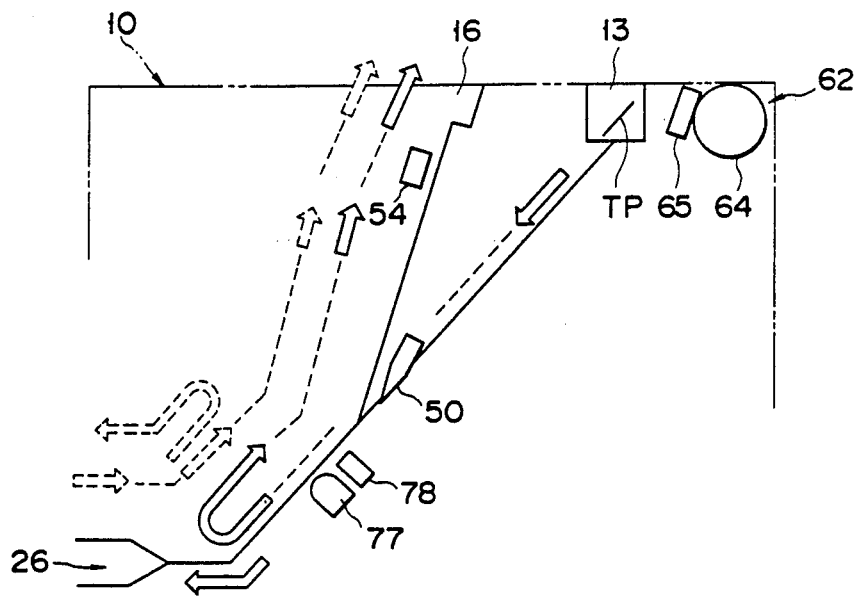
FIG. 19 is a view showing a flow of a ticket obtained when a plane ticket is issued.
Figure 20:
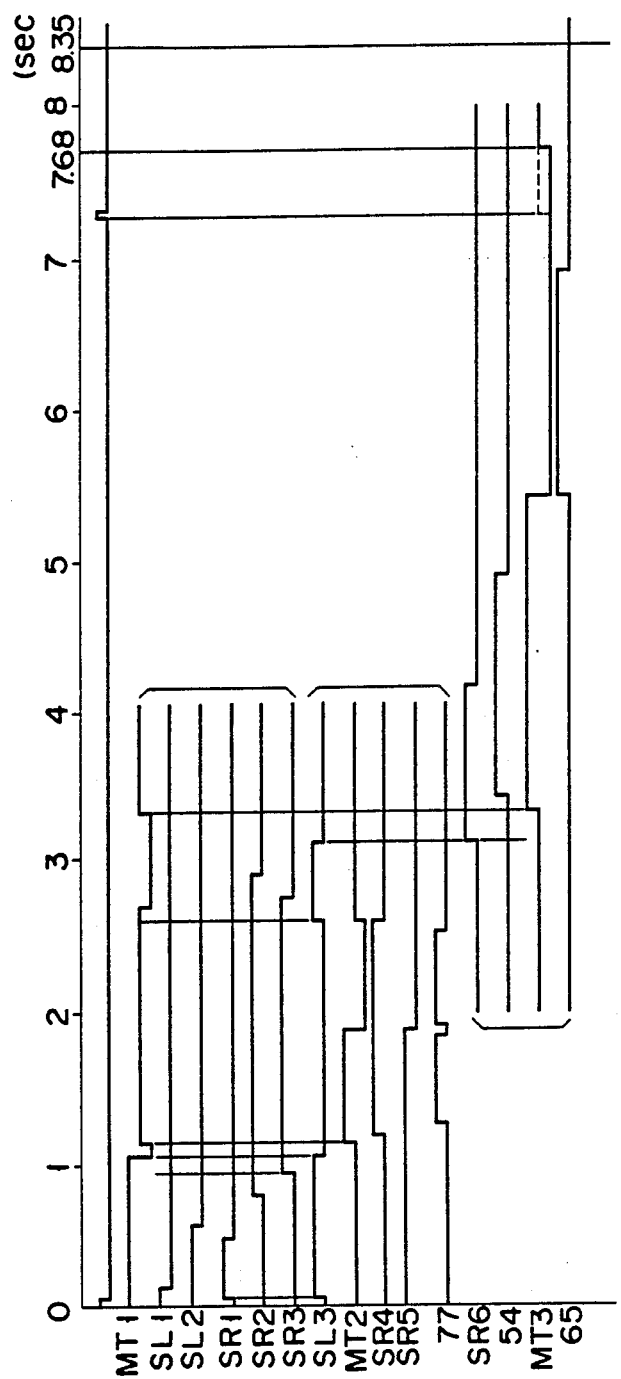
FIG. 20 is a timing chart showing an operation performed in a first mode.
Figure 21:
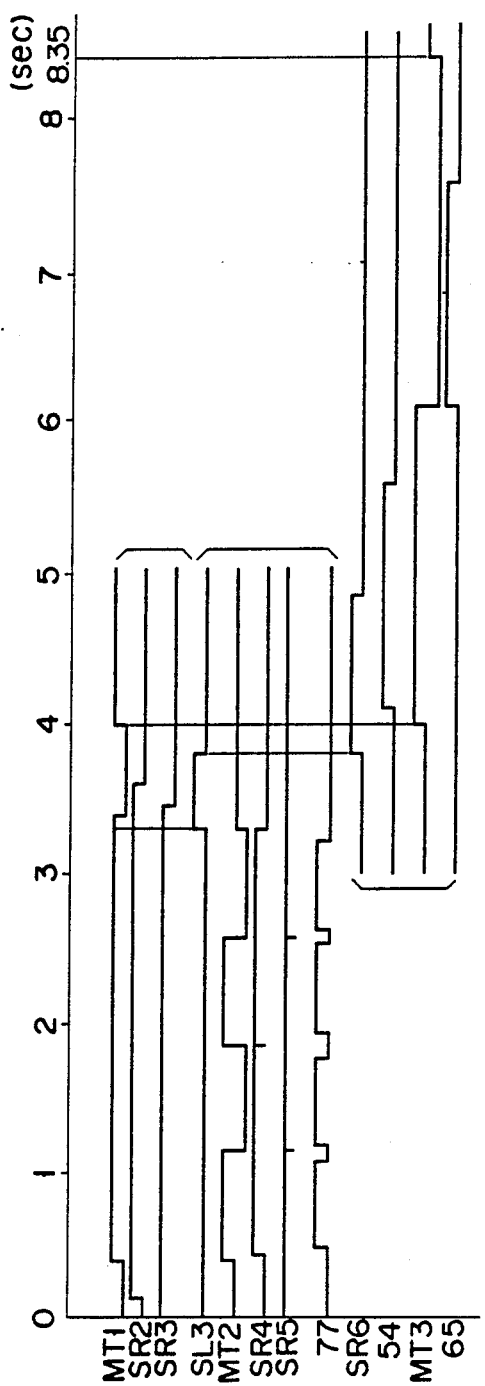
FIG. 21 is a timing chart showing an operation performed in a second mode.

An operation of the embodiment having the above arrangement will be described below with reference to FIGS. 19 to 21.

In this embodiment, tickets are issued in various manners. As a ticket to be issued, either plane ticket paper TP stored in hopper 13 or a ticket inserted from ticket insertion port 26 is used. As information for issuing a ticket, either data input from keyboard 11 and ten-key pad 12 or data recorded on a ticket inserted from port 26 and read by bar code reader 78 and magnetic head 77 is used.

First, a ticket issuing operation using paper TP stored in hopper 13 will be described with reference to FIGS. 19 and 20. In this ticket issuing operation, paper TP moves as indicated by solid line arrows in FIG. 19. FIG. 20 is a timing chart for explaining a ticket issuing operation.

That is, a ticket issuing mode is set by operating keyboard 11, and information is transmitted to/received from the host apparatus in an interactive manner using keyboard 11 and ten-key pad 12. Then, when a desired plane ticket becomes issuable, motor MT1 is driven in the forward direction to rotate pickup roller 33, convey rollers 35 and 36, and insertion roller 37, and one sheet of paper TP is picked up from hopper 13.

When paper TP is picked up, paper feed solenoid SL1 is turned off, and stopper member 1a is engaged with roller 33. As a result, roller 33 is stopped regardless of rotation of motor MT1.

Picked up paper TP is conveyed to convey path 34. When a leading end portion of paper TP is detected by paper feed sensor SR1, solenoid SL3 is turned on, and the distal end portion of stopper member 47 is extracted from path 34. Therefore, paper TP is conveyed toward port 26.

Then, when a trailing end portion of paper TP is detected by sensor SR1, solenoid SL2 is turned off to stop roller 35. When paper TP is sequentially detected by positioning sensor SR2 and insertion sensor SR3, motor MT1 is driven in the reverse direction, solenoid SL3 is turned off, and stopper member 47 is inserted in path 34. Therefore, paper TP is conveyed in the reverse direction by roller 37, and motor MT1 is stopped after paper TP abuts against closed stopper member 47. At this time, roller 37 is rotated immediately after paper TP abuts against stopper member 47. However, since tension of driven roller 40 is weak, paper TP and roller 37 slip relative to each other. Therefore, paper TP is not conveyed but stopped at a position where paper TP abuts against stopper member 47, i.e., a position of magnetic recording encoding unit 48. At this position, paper TP is sandwiched between rollers 37 and 40.

When motor MT1 is stopped to stop paper TP as described above, motor MT2 is driven, and head unit 76 is reciprocally moved in accordance with output signals from H/P sensor SR4 and E/P sensor SR5. While unit 76 is reciprocally moved, predetermined information such as a destination, a flight number, and a seat number are written (magnetically recorded on a magnetic stripe), and the written information are read out for verification, by magnetic head 77. Note that in this case, a reading operation of a bar code is not performed.

Then, when H/P sensor SR4 detects that unit 76 has returned to its home position, solenoid SL3 is turned on, stopper member 47 is extracted from path 34, and motor MT1 is driven in the reverse direction. Therefore, paper TP is conveyed through path 34 to be separated away from port 26 and guided to branch path 49 through selector gate 50.

When the leading end portion of paper TP is detected by printing start sensor SR6, solenoid SL3 is turned off, and stopper member 47 is inserted in path 34. Thereafter, motor MT3 is driven in the forward direction to rotate platen roller 52, and a printing signal is supplied to thermal head 54. As a result, as shown in FIG. 22B, information similar to that recorded on magnetic stripe MS is printed on the surface of paper TP. When printing is finished, paper TP is stacked in stacker 16.

Meanwhile, when the above printing operation is finished, motor MT3 is rotated in the reverse direction to drive platen roller 64 of journal printer 62, and the printing signal is supplied to thermal head 65. Therefore, information similar to that printed on paper TP is printed on journal paper P.

Note that if an error occurs in processing using magnetic head 77, motor MT1 is driven in the forward direction, and paper TP is discharged from port 26.

With the above operation, a desired plane ticket can be issued using paper TP stored in hopper 13.

Then, an operation performed when a ticket is inserted from port 26 will be described with reference to FIGS. 19 and 21. In this case, a ticket moves as indicated by broken line arrows in FIG. 19. FIG. 21 is a timing chart for explaining a ticket issuing operation.

A ticket inserted from port 26 has a bar code representing a ticket type and a magnetic stripe if the ticket is a party plane ticket. That is, when a large or small ticket is inserted in port 26 and detected by insertion sensor SR3, motor MT1 is driven in the reverse direction, and the inserted ticket is conveyed inside apparatus main body 10 by insertion roller 37 and driven roller 40. At this time, since solenoid SL3 is turned off, stopper member 47 projects into convey path 34, and the conveyed ticket abuts against stopper member 47.

When the ticket is conveyed in path 34 and detected by positioning sensor SR2, motor MT1 is stopped. In this state, motor MT2 is driven in the forward and reverse directions in accordance with outputs from H/P sensor SR4 and E/P sensor SR5, and therefore head unit 76 is reciprocally moved. As a result, the bar code is read by bar code reader 78, thereby discriminating a ticket type of the inserted ticket.

Thereafter, an operation is performed in accordance with the discriminated ticket type. After the operation is finished, solenoid SL3 is turned on to extract stopper member 47 from path 34, and motor MT1 is driven in the reverse direction to convey the ticket to branch path 49.

In this case, if the inserted ticket is a party plane ticket, the bar code and information on the magnetic stripe are read during one reciprocation of head unit 76, and predetermined information is written and the written information is read for verification during the next reciprocation. An operation of magnetic head 77 shown in FIG. 21 is performed when the inserted ticket is a party plane ticket.

Thereafter, the party plane ticket is conveyed to printer 51, predetermined information is printed thereon, and then the ticket is stacked in stacker 16. In addition, journal is printed on the ticket by journal printer 62.

When the inserted ticket is a handwritten plane ticket or a complimentary ticket, the ticket is subjected to bar code reading and then conveyed to stacker 16 without performing magnetic reading.

When a detailed statement of a credit is inserted, the statement is subjected to bar code reading and then conveyed to stacker 16 without performing magnetic reading. Then, predetermined information is printed on the statement, and the statement is stacked in stacker 16. Thereafter, journal printer 62 is driven to print journal.

As has been described above, according to the above embodiment, communication control 123 for transmitting/receiving information to/from the host apparatus, magnetic head 77 for reading/writing magnetic information from/in a plane ticket or the like, bar code reader 78 for reading a bar code, printer 51 for printing predetermined information on a plane ticket or the like, and journal printer 62 for printing a journal are arranged in apparatus main body 10. Therefore, the apparatus itself can issue a plane ticket. As a result, users need not buy a reservation ticket and exchange the ticket with a plane ticket at an airport.

A plane ticket is picked up from hopper 13 and conveyed in the forward and reverse directions by only motor MT1, and printer 51 and journal printer 62 are driven by only motor MT3. Therefore, main body 10 can be made smaller in size and hence can be installed in a small agency or company.

A ticket is conveyed such that its shorter sides are aligned with a convey direction. Therefore, a ticket convey efficiency can be increased.

Head unit 76 is moved in a direction perpendicular to the ticket convey direction, i.e., a direction of the longer sides of the ticket. Therefore, magnetic recording encoding unit 48 can be compactly incorporated in main body 10.

Platen roller 52 constituting printer 51 is located in main body 10, and thermal head 54, ink ribbon 53, and the like are located in pivoting unit 23. Therefore, by opening pivoting unit 23, ribbon 53 can be easily replaced.

Guide portion 27 is formed in ticket insertion port 26. Therefore, either a large or small ticket can be reliably positioned and inserted in port 26.

Stopper member 47 driven by solenoid SL3 is pivotally mounted on ticket holding unit 72, and unit 72 is mounted on head driving unit 71. Therefore, as compared with a case wherein stopper member 47 is arranged independently of units 72 and 71, accuracy of a mounting position can be improved. In addition, by assembling stopper member 47 together with units 72 and 71, the number of assembly steps can be reduced.

Guide unit 85 is mounted on magnetic head 77 and bar code reader 78. When head unit 76 moves to perform magnetic processing or bar code reading, a ticket is stably held by unit 85. Therefore, no error occurs during magnetic processing or bar code reading.

Ten-key pad 12 is disposed in addition to keyboard 11, and a personal identification number of a credit card is input from pad 12. Therefore, when a customer inputs a personal identification number, the number cannot be seen by an operator. Therefore, a function of keeping a secret is excellent as compared with a case wherein a personal identification number is input from keyboard 11.

What is claimed is:

1. An apparatus for magnetically recording data on a card having a magnetic stripe extending along a long side thereof, comprising:
   convey means for conveying the card along a convey path in a convey direction such that shorter sides of the card are aligned with the convey direction;
   magnetic recording means, for magnetically recording means having a magnetic head which is provided at a predetermined position position on the convey path and is movable in a direction perpendicular to the convey path; and
   locking/unlocking means for interrupting the operation of said convey means when the card reaches the predetermined position at which said magnetic head is provided, and for moving said magnetic head in a direction perpendicular to the convey path so that the magnetic head magnetically records data on the magnetic stripe of the card.

2. An apparatus according to claim 1 in which said magnetic head moves in a forward direction and said magnetic recording means reads out data recorded during forward movement while said magnetic head moves in a reverse direction.

3. An apparatus according to claim 1, in which said magnetic head comprises a combination head which reads, and writes data.

4. An apparatus according to claim 1, which further comprises:
   card holder means for holding a large number of cards so that the shorter sides of each card are aligned with the convey direction and supplying the cards individually to one end of said convey means.

5. An apparatus according to claim 1, further comprising printing means for printing visible data on the card conveyed by said convey means.

6. An apparatus according to claim 5, in which said printing means includes a linear printing member, arranged in a direction perpendicular to the convey direction, for printing in units of lines in the direction perpendicular to the convey direction.

7. A plane ticket issuing apparatus comprising:
   means for inputting input data;
   means for communicating with a host apparatus on a basis of said input data and receiving from said host predetermined host data required for issuing a plane ticket;
   means for holding a plurality of plane tickets, each having a magnetic stripe extending in a longitudinal direction thereof;
   convey means for picking up the plane tickets one by one from said holding means and conveying them along a convey path in a convey direction such that shorter sides of each plane ticket are aligned with the convey direction;
   locking/unlocking means for stopping, at a predetermined position, the conveying of the plane ticket conveyed by said convey means;
   magnetic recording means, having a magnetic head movable in a direction perpendicular to the convey direction, for magnetically recording the predetermined data on the magnetic stripe of the plane ticket stopped by said locking/unlocking means; and
   printing means for printing at least information corresponding to said predetermined data on the plane ticket after said host data is magnetically recorded on the magnetic stripe.

8. An apparatus according to claim 7, further comprising:
- an insertion port into which a card having a bar code according to the type of the card is externally inserted;
- means for feeding the card inserted in said insertion port to the convey path of said convey means;
- discriminating means for reading the bar code of the card inserted from said insertion port and discriminating the type of the card; and
- inhibiting means for selectively inhibiting operations of said magnetic recording means and said printing means in accordance with a discrimination result.

9. An apparatus according to claim 8, in which said card inserted from said insertion port is one of a party plane ticket, a handwritten plane ticket, a complimentary ticket, and a detailed statement of a credit recording a note of airline ticket issuance.

10. An apparatus according to claim 8, in which said inhibiting means inhibits the operation of said magnetic recording means when the card inserted in said insertion port is one of a handwritten plane ticket, a complimentary ticket, and a detailed statement of a credit, and inhibits the operation of said printing means when the card is one of a handwritten plane ticket and a complimentary ticket.

11. An apparatus for magnetically recording data on having a magnetic stripe extending along a longer side hereof, comprising:
- card holding means for holding a plurality of cards;
- magnetic recording means having a magnetic head moving in a direction along the magnetic stripe of the card;
- first convey means, having one end connected to said card holding means via a card pick-up means, for conveying the card picked up by said card pick-up means to said magnetic recording means such that shorter sides of the card are aligned with a convey direction of the card;
- second convey means, having one end connected to a card insert port, for conveying the card inserted through said card insert port to said magnetic recording means such that the shorter sides of the card are aligned with the convey direction of the card;
- third convey means, having one end connected to said magnetic recording means, for discharging, through an outlet port, a card on which data has been recorded.

12. An apparatus according to claim 11, in which said card holding means and said outlet port are provided in an upper portion of said apparatus and said insert port is provided in a front portion of said apparatus.

13. An apparatus according to claim 11, further comprising:
- means for judging whether or not a card inserted through said insert port is genuine in accordance with predetermined criteria; and
- means for rejecting a card inserted through said insert port when the card is judged to be not genuine, and discharging the card through the insert port.

14. An apparatus according to claim 11, which comprising a main body and a sub body from which is pivotally mounted on the front portion of said main body, said sub body front including the insert port and a part of said second convey means, and said main body including the remaining part of said second convey means, said first convey means, said third convey means, said card holding means, and said magnetic recording means.

15. An apparatus according to claim 14, in which said front portion comprises display means for displaying a guidance message and said main body comprises disk memory means having a disk insert port formed in the front of the main body.

* * * * *